(12) United States Patent
Sivaraman

(10) Patent No.: US 9,937,765 B2
(45) Date of Patent: Apr. 10, 2018

(54) METHOD OF ADAPTING AN AUTOMOBILE SUSPENSION IN REAL-TIME

(71) Applicant: Ram Sivaraman, Dublin, CA (US)

(72) Inventor: Ram Sivaraman, Dublin, CA (US)

(73) Assignee: Ram Sivaraman, Dublin, CA (US)

( * ) Notice: Subject to any disclaimer, the term of this patent is extended or adjusted under 35 U.S.C. 154(b) by 0 days.

(21) Appl. No.: 14/697,620

(22) Filed: Apr. 28, 2015

(65) Prior Publication Data

US 2016/0318365 A1    Nov. 3, 2016

(51) Int. Cl.

| | |
|---|---|
| G05D 1/06 | (2006.01) |
| G05D 1/08 | (2006.01) |
| B64C 39/02 | (2006.01) |
| G08G 5/00 | (2006.01) |
| B64D 45/04 | (2006.01) |
| G05D 1/00 | (2006.01) |
| G07C 5/08 | (2006.01) |
| B60G 17/0165 | (2006.01) |
| B60G 17/019 | (2006.01) |
| B60G 17/06 | (2006.01) |
| G01S 17/88 | (2006.01) |
| G01S 13/88 | (2006.01) |

(52) U.S. Cl.
CPC ....... *B60G 17/0165* (2013.01); *B60G 17/019* (2013.01); *B60G 17/06* (2013.01); *G01S 13/88* (2013.01); *G01S 17/88* (2013.01); *B60G 2400/204* (2013.01); *B60G 2400/82* (2013.01); *B60G 2400/823* (2013.01); *B60G 2401/14* (2013.01); *B60G 2401/174* (2013.01); *B60G 2500/10* (2013.01)

(58) Field of Classification Search
CPC .............. B60G 17/0165; B60G 17/019; B60G 2400/823; B60G 2400/204; B60G 2401/14; B60G 2401/174; B60G 2400/82; G01S 13/86
USPC ........................................................... 701/37
See application file for complete search history.

(56) References Cited

U.S. PATENT DOCUMENTS

2012/0140071 A1\* 6/2012 Judell .................... F16F 15/002
                                                                  348/144
2014/0297116 A1\* 10/2014 Anderson ................ H02K 5/12
                                                                  701/37

\* cited by examiner

*Primary Examiner* — Anne M Antonucci
(74) *Attorney, Agent, or Firm* — Gordon Intellectual Property

(57) ABSTRACT

Methods and systems for adapting an automobile suspension in real-time may include a radar module reading a surface topology ahead of a vehicle. A processor may convert an output signal of the radar module into a suspension input signal that corresponds to an amount by which a wheel suspension device of the vehicle should be adjusted to counteract the surface topology. The processor may adjust a mechanical attribute of the wheel suspension device in real-time based on the suspension input signal. In an embodiment, the processor may be configured to calculate the amount by which the wheel suspension device should be adjusted based on a speed of the vehicle and a size of the surface topology. In one embodiment, the radar module may include a gimbal mount configured to provide vertical and horizontal visibility to the radar module.

14 Claims, 5 Drawing Sheets

METHOD OF ADAPTING AN AUTOMOBILE SUSPENSION IN REAL-TIME

FIELD

This disclosure relates generally to automobiles, and more specifically, to a method of adapting an automobile suspension in real-time.

BACKGROUND

Automobiles typically include suspension systems to help reduce the impacts between the wheels of the vehicle and uneven roadway surfaces, such as ruts, bumps, potholes, and debris. Suspension systems may include metal springs, air bellows, hydro-pneumatic devices (e.g., air/oil cylinders), hydraulic shock absorbers, or combinations thereof. Suspension systems are included in automobiles in order to improve both the handling and ride quality of the vehicle by dampening the effects of rough roadway surfaces, thereby increasing the likelihood that the automobile chassis will experience an even ride relative to the wheels and axles. However conventional smart suspension systems operate only when the wheels physically encounter the altering surface topology. In most cases this still allows the automobile chassis to be affected by some ruts and bumps in the roadway in spite of the suspension system. Unnecessary bumps and jolts are undesirable from a driver comfort perspective and can even be dangerous for certain types of vehicles, such as ambulances.

SUMMARY

Methods and systems for adapting an automobile suspension in real-time are described. In an embodiment, a method may include reading, with a radar module, a surface topology ahead of a vehicle. The method may also include converting, with a processor, an output signal of the radar module into a suspension input signal, wherein the suspension input signal corresponds to an amount by which a wheel suspension device of the vehicle should be adjusted to counteract the surface topology. Additionally, the method may include adjusting, with the processor, a mechanical attribute of the wheel suspension device in real-time based on the suspension input signal.

In a further embodiment, converting the output signal into the suspension input signal may include calculating, with the processor, the amount by which the wheel suspension device should be adjusted based on a speed of the vehicle and a size of the surface topology. In an embodiment, the method may include providing, with the processor, a road hazard notification to a user of the vehicle via an integrated output device in response to the radar module detecting a hazard having a size that exceeds a predefined hazard size threshold. The method may include providing, with the processor, a relative lane quality notification to a user of the vehicle via an integrated output device in response to a horizontal scan of the radar module indicating that an adjacent lane topology is more or less favorable than a current lane that the vehicle is in.

In an embodiment, the radar module may include a gimbal mount configured to provide vertical and horizontal visibility to the radar module. In one embodiment, the method may include adjusting, with the processor, the gimbal mount to provide a long distance visibility orientation of the radar module in response to the processor detecting that the vehicle is travelling above a speed threshold or there is not an obstruction directly in front of the vehicle. Additionally, the method may include adjusting, with the processor, the gimbal mount to provide a short distance visibility orientation of the radar module in response to the processor detecting that the vehicle is travelling below a speed threshold or there is an obstruction directly in front of the vehicle.

In a further embodiment, the radar module may include a laser-based infrared (IR) module, an optical camera module, or a light detection and ranging (LIDAR) module. In an embodiment, the method may include storing, with a memory module, a first surface contour data corresponding to a first route; comparing, with the processor, a second surface contour data corresponding to a currently traveled route to the first surface contour data of the first route; and adjusting, with the processor, the mechanical attribute of the wheel suspension device based on the first surface contour data in response to the second route matching the first route.

A system for real-time adaptive automobile suspension may include a radar module configured to read a surface topology ahead of a vehicle, and a processor configured to convert an output signal of the radar module into a suspension input signal, wherein the suspension input signal corresponds to an amount by which a wheel suspension device of the vehicle should be adjusted to counteract the surface topology. Additionally, the processor may be configured to adjust a mechanical attribute of the wheel suspension device in real-time based on the suspension input signal. In an embodiment, the processor may be configured to calculate the amount by which the wheel suspension device should be adjusted based on a speed of the vehicle and a size of the surface topology.

An apparatus for real-time adaptive automobile suspension may include a radar module configured to read a surface topology ahead of a vehicle, and a processor configured to convert an output signal of the radar module into a suspension input signal, wherein the suspension input signal corresponds to an amount by which a wheel suspension device of the vehicle should be adjusted to counteract the surface topology. In an embodiment, the processor may be configured to adjust a mechanical attribute of the wheel suspension device in real-time based on the suspension input signal.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Embodiments of methods and systems for adapting an automobile suspension in real-time are described. In an embodiment, a real-time adaptive automobile suspension system includes a sensor module configured to read the surface topology ahead of the automobile and to adjust the suspension system to counteract the upcoming surface topology.

In one embodiment a real-time adaptive automobile suspension system may include a gimbal-mounted radar module located near the front grille of the vehicle. The radar module may be configured to scan the road surface ahead and also to the side of the vehicle, thereby detecting bumps and measuring their size. The radar module may then send information about any upcoming road surface topology changes to a processor configured to calculate an amount by which the suspension devices of one or more wheels on the vehicle should be adjusted to effectively counteract the upcoming roadway surface topology. The gimbal mount enables the orientation of the radar module to be adjusted based on the speed of the vehicle—for example, scanning a longer distance in front of the vehicle when travelling at high speeds. Similarly, if another vehicle is located in front of the vehicle, then the gimbal mount enables the radar module to be adjusted so that the system scans the road surface between the two vehicles. In an embodiment the system may provide road hazard notifications to a driver. In another embodiment the system may store topology data of frequently traveled routes.

The real-time adaptive automobile suspension system provides feedback from the radar module to the wheel suspension devices before the vehicle reaches the spot being scanned. The system thus provides an advanced reaction time for the processor relative to conventional smart systems that use the wheels to sense roadway topology. In an embodiment the processor is configured to accurately adjust the wheel suspension devices based on both the vehicle speed and the roadway topology size. The real-time adaptive automobile suspension system enhances ride quality while also improving the lifetime of the wheel suspension devices because the processor can dynamically adjust the suspension components in real-time to ensure that the suspension components are not subjected to unnecessary jolts and/or overworked at low speeds. In one embodiment the radar module is based on an infrared (IR) wavelength that is capable of scanning at night. Furthermore, IR wavelengths are friendly to the human eye, so the radar module will be safe to the eyes of drivers and pedestrians.

Figure 1:
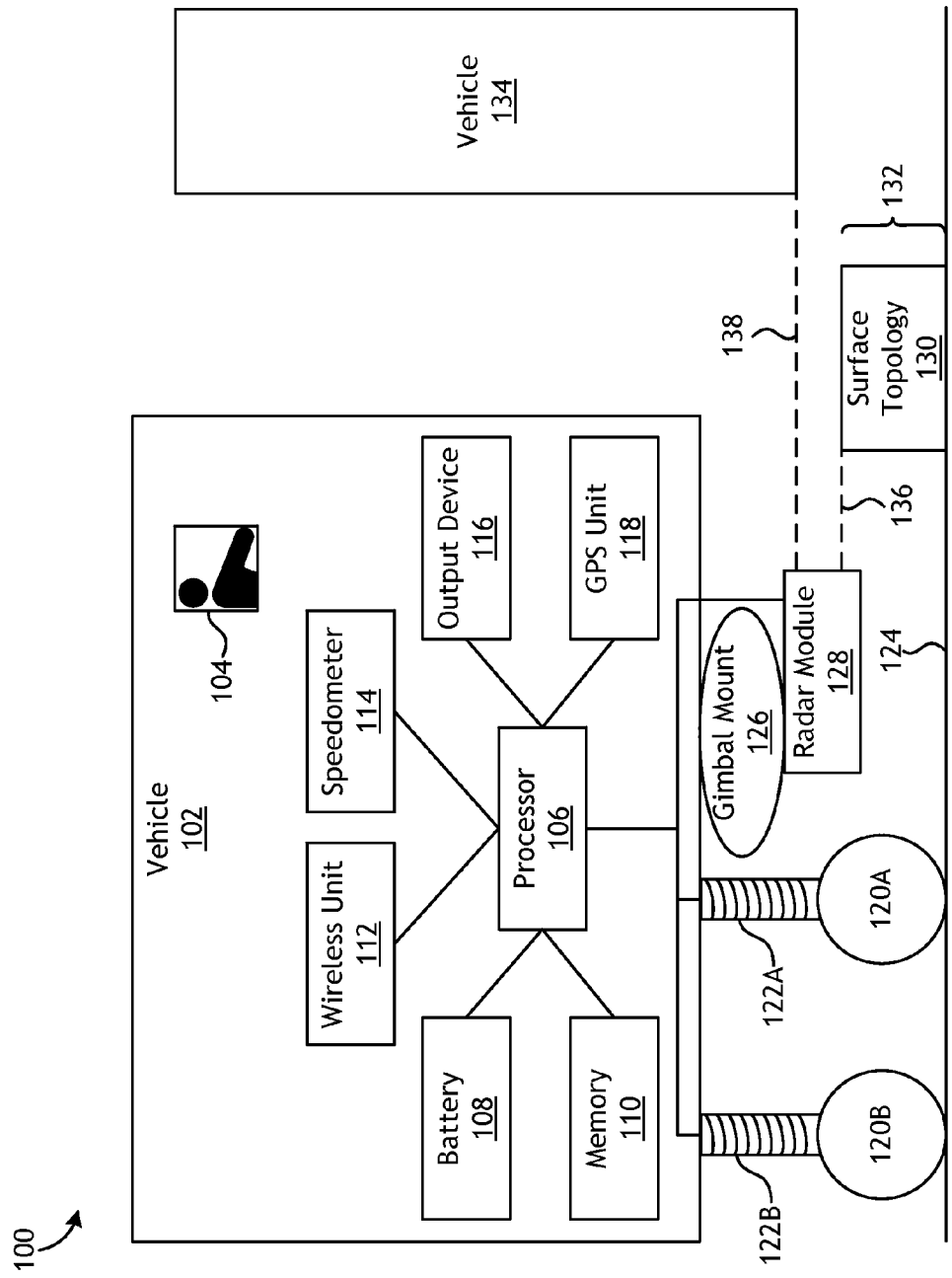
FIG. 1 is a schematic block diagram illustrating one embodiment of a system for adapting an automobile suspension in real-time.

FIG. 1 is a schematic block diagram illustrating one embodiment of a system 100 for adapting an automobile suspension in real-time. In an embodiment the system 100 includes a first vehicle 102, which may be piloted by a driver 104. The first vehicle 102 may include a processor 106 coupled to a battery 108, and a memory 110. In various embodiments system 100 may be a single-processor system including one processor 106, or a multi-processor system including two or more processors. Processor 106 may be any processor capable of executing program instructions. For example, in various embodiments, processor 106 may be a general-purpose or embedded processor implementing any of a variety of instruction set architectures (ISAs), such as the x86, POWERPC®, ARM®, SPARC®, or MIPS® ISAs, or any other suitable ISA. In multi-processor systems, each of the processor(s) may commonly, but not necessarily, implement the same ISA. Also, in some embodiments, at least one processor(s) may be a graphics processing unit (GPU) or other dedicated graphics-rendering device. In an embodiment battery 108 may provide power to processor 106 and/or other electrical components of vehicle 102 that are coupled to processor 106.

Memory 110 may be configured to store program instructions and/or data accessible by processor 106. For example, memory 110 may be used to store a software program and/or database shown in FIG. 2. In various embodiments, memory 110 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described above, may be stored within memory 110 as program instructions and data storage, respectively. In other embodiments, program instructions and/or data may be received, sent or stored upon different types of processor-accessible media or on similar media separate from memory 110 or system 100. Generally speaking, a processor-accessible medium may include any tangible, non-transitory storage media or memory media such as electronic, magnetic, or optical media-e.g., disk or CD/DVD-ROM coupled to processor 106, or non-volatile memory storage (e.g., "flash" memory).

The terms "tangible" and "non-transitory," as used herein, are intended to describe a processor-readable storage medium (or "memory") excluding propagating electromagnetic signals, but are not intended to otherwise limit the type of physical processor-readable storage device that is encompassed by the phrase processor-readable medium or memory. For instance, the terms "non-transitory processor readable medium" or "tangible memory" are intended to encompass types of storage devices that do not necessarily store information permanently, including for example, random access memory (RAM). Program instructions and data stored on a tangible processor-accessible storage medium in non-transitory form may further be transmitted by transmission media or signals such as electrical, electromagnetic, or digital signals, which may be conveyed via a communication medium such as a network and/or a wireless link.

In an embodiment the processor 106 may also be coupled to a wireless unit 112, a speedometer 114, an output device 116, and a Global Positioning System (GPS) unit 118. Wireless unit 112 may be configured for communicating between system 100 and one or more other vehicles, such as second vehicle 134. In an embodiment wireless unit 112 may enable processor 106 to communicate wirelessly with output device 116, gimbal mount 126, and/or radar module 128. Similarly, wireless unit 112 may enable processor 106 to communicate wirelessly with an external data storage unit, external radar module calibration unit, and/or a web-based roadway surface topology route storage system. In various embodiments, wireless unit 112 may be configured to communicate via a wireless 802.11 connection, a Bluetooth connection, or the like. In one embodiment output device 116 may be a "heads up" video display located between driver 104 and a front portion of vehicle 102 (e.g., near a windshield or dashboard of vehicle 102). In another embodiment output device 116 may include one or more signal lights, such as light emitting diodes (LEDs), positioned in the dashboard and/or side mirrors of vehicle 102. In yet another embodiment output device 116 may be one or more audio speakers configured to selectively signal driver 104 via audible noise prompts and/or synthesized voice commands.

In one embodiment processor 106 may use GPS unit 118 to identify frequently travelled routes, and processor 106 may use memory 110 to store surface topology data of the frequently travelled (i.e., "known") routes, thereby enabling system 100 to recall the stored surface data and operate with increased efficiency by not needing to "re-learn" frequently travelled routes. In an embodiment memory 110 may serve as a "black box" by storing the number of adjustments made to vehicle suspension devices 122A-B along a route and/or the mechanical values by which vehicle suspension devices 122A-B were adjusted along a route.

Such "black box" functionality may enable a certified professional service person to fine tune the parameters of system 100 based on past performance, and/or to recover data corresponding to road hazard attributes after a vehicle accident has occurred. In another embodiment processor 106 may use wireless unit 112 to communicate bi-directionally with one or more other vehicles that are configured to "share" surface topology data, route contour maps, and/or road hazard information. The system 100 may thereby be configured to send surface topology data to other vehicles (e.g., vehicles behind vehicle 102 that have not yet encountered the surface topology) and/or receive surface topology data from other vehicles (e.g., vehicles ahead of vehicle 102 that may have already encountered upcoming surface topologies).

In an embodiment vehicle 102 may include two or more wheels 120A-B connected to vehicle 102 via vehicle suspension devices 122A-B, respectively. Vehicle suspension devices 122A-B may be electronically adjustable modules, such as hydraulic shock absorbers, hydro-pneumatic devices, adjustable air springs, electromagnetic suspension modules, or the like. In one embodiment an adjustable gimbal mount 126 (i.e., a pivoted support allowing rotation about an axis or multiple axes) may be positioned near the front of vehicle 102 (e.g., under the front bumper, or near the front grille). Gimbal mount 126 may be connected to a radar module 128 configured to scan the roadway surface 124 in front of and/or to the sides of vehicle 102. In an embodiment gimbal mount 126 may contain one or more electric motors that enable processor 106 to selectively move radar module 128 in vertical and/or horizontal directions.

In one embodiment roadway surface 124 may include one or more surface topology items, such as surface topology 130. Surface topology 130 may have a topology size 132. Topology size 132 may correspond to a height if surface topology 130 extends above roadway surface 124 or a depth if surface topology 130 corresponds to a depression below the top of roadway surface 124. In various embodiments surface topology 130 may be a bump or bulge in roadway surface 124, a piece of debris, a roadway hazard, a pothole, a crack, or the like. Similarly, surface topology 130 may be a traffic safety device, such as a reflector, lane marker, or rumble strip. In an embodiment surface topology 130 may be located a first distance 136 between the radar module 128, which may be located on the front end of vehicle 102. Radar module 128 may be configured to measure first distance 136 and topology size 132.

In an embodiment, the system 100 may be calibrated using a flat surface (e.g., at a manufacturer's facility), and the calibrated surface information may be stored in memory 110 as reference data. In one embodiment radar module 128 may include a stereoscopic sensor unit (e.g., a two camera unit) having two cameras or sensors mounted in the same plane on gimbal mount 126. The stereoscopic sensor unit may be configured to accurately detect the depth of features on roadway surface 124, thereby enabling processor 106 to generate a contour map. Processor 106 may generate a contour map by using image edges obtained via a standard edge detection method. Processor 106 may use a "spline" fitting method to obtain roughness information from the image edge data, and then processor 106 may apply a "Kalman" filter to the spline data to make the contour map more robust and accurate.

Figure 3:
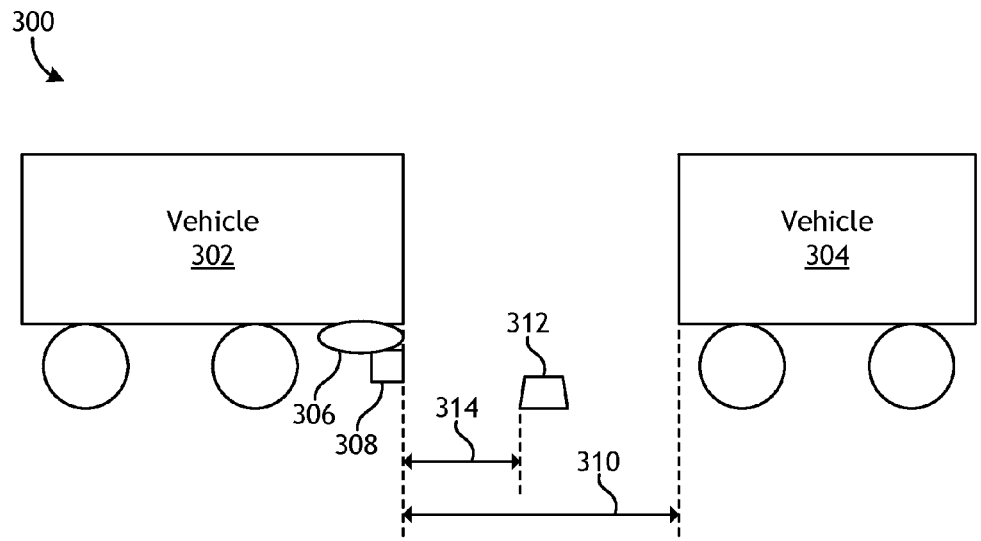
FIG. 3 is a schematic block diagram illustrating one embodiment of an apparatus for adapting an automobile suspension in real-time.
Figure 4:
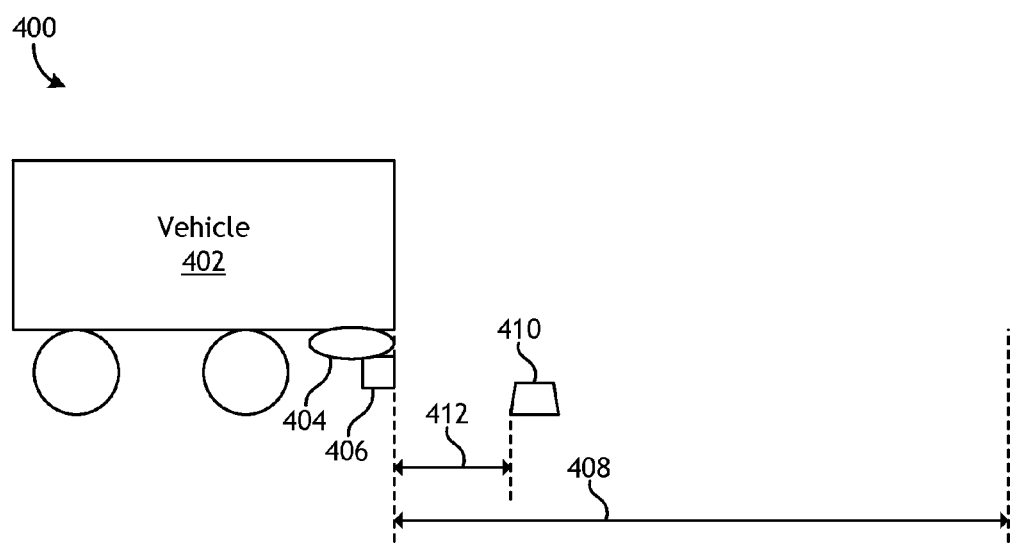
FIG. 4 is a schematic block diagram illustrating one embodiment of an apparatus for adapting an automobile suspension in real-time.

In an embodiment radar module 128 may also be configured to measure a second distance 138 between vehicle 102 and a second vehicle 134, and to compare the second distance 138 to a pre-programmed threshold distance. For example, if the threshold distance is defined as 15 feet (i.e., approximately one car length), then processor 106 would adjust gimbal mount 126 such that radar module 128 had an orientation corresponding to a field of view from zero feet up to a maximum value equal to second distance 138 in response to second vehicle 134 being within the threshold distance. In another embodiment processor 106 might adjust gimbal mount 126 such that radar module 128 has an orientation corresponding to a long distance field of view (i.e., well ahead of vehicle 102) if there are no other vehicles or large obstacles within the threshold distance directly in front of vehicle 102. These embodiments are illustrated in FIG. 3 and FIG. 4, respectively.

In various embodiments radar module 128 may include a laser-based infrared (IR) module, an optical camera module, a stereoscopic camera module, a microwave radar module, or the like. Radar module 128 may be communicatively connected to processor 106 with a wired connection, or with a wireless connection via wireless unit 112. Processor 106 may also determine a current speed of vehicle 102 based on a wired or wireless connection to speedometer 114. In one embodiment processor 106 may be configured to adjust one or more mechanical properties of one or more vehicle suspension devices 122A-B in response to data received from radar module 128 (e.g., topology size 132 and first distance 136) and data received from speedometer 114 (e.g., the current speed of vehicle 102). Processor 106 may thus convert electronic surface topology and velocity data into one or more mechanical values by which one or more of vehicle suspension devices 122A-B should be adjusted to counteract surface topology 130 in advance of wheels 120A-B encountering surface topology 130.

In one embodiment processor 106 may also be configured to provide a visual and/or audio alert to driver 104 via output device 116 in response to radar module 128 detecting surface topology 130. In one embodiment output device 116 may be a "heads up" display positioned in close proximity to the front window of vehicle 102. In another embodiment output device 116 may provide a video and/or audio warning via a Liquid Crystal Display (LCD) screen, such as a screen also used for a backup camera and/or the interface screen for GPS unit 118, integrated within the dashboard of vehicle 102. In another embodiment processor 106 may not adjust vehicle suspension devices 122A-B (i.e., not counteract surface topology 130 and thereby enable driver 104 to feel surface topology 130) in response to surface topology 130 corresponding to a traffic safety feature, such as a rumble strip, lane boundary reflector, land boundary bump, or the like. Processor 106 may thus use data from radar module 128 and/or GPS unit 118 (e.g., the current location of vehicle 102) to selectively counteract the effects of road hazard topologies while intentionally not counteracting the effects of road safety topologies in order to encourage driver 104 to manually reduce the speed of vehicle 102 when road safety topologies are encountered by wheels 120A-B (i.e., driver 104 will still be able to feel the vibrations resulting from safety bumps). In another embodiment, driver 104 may press a button in vehicle 102 to selectively disengage or deactivate the real-time adaptive automobile suspension system temporarily (e.g., during off-road sporting events).

A person of ordinary skill in the art will appreciate that system 100 is merely illustrative and is not intended to limit the scope of the disclosure described herein. In particular, the real-time adaptive automobile suspension system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other real-time adaptive automobile suspension system configurations.

Figure 2:
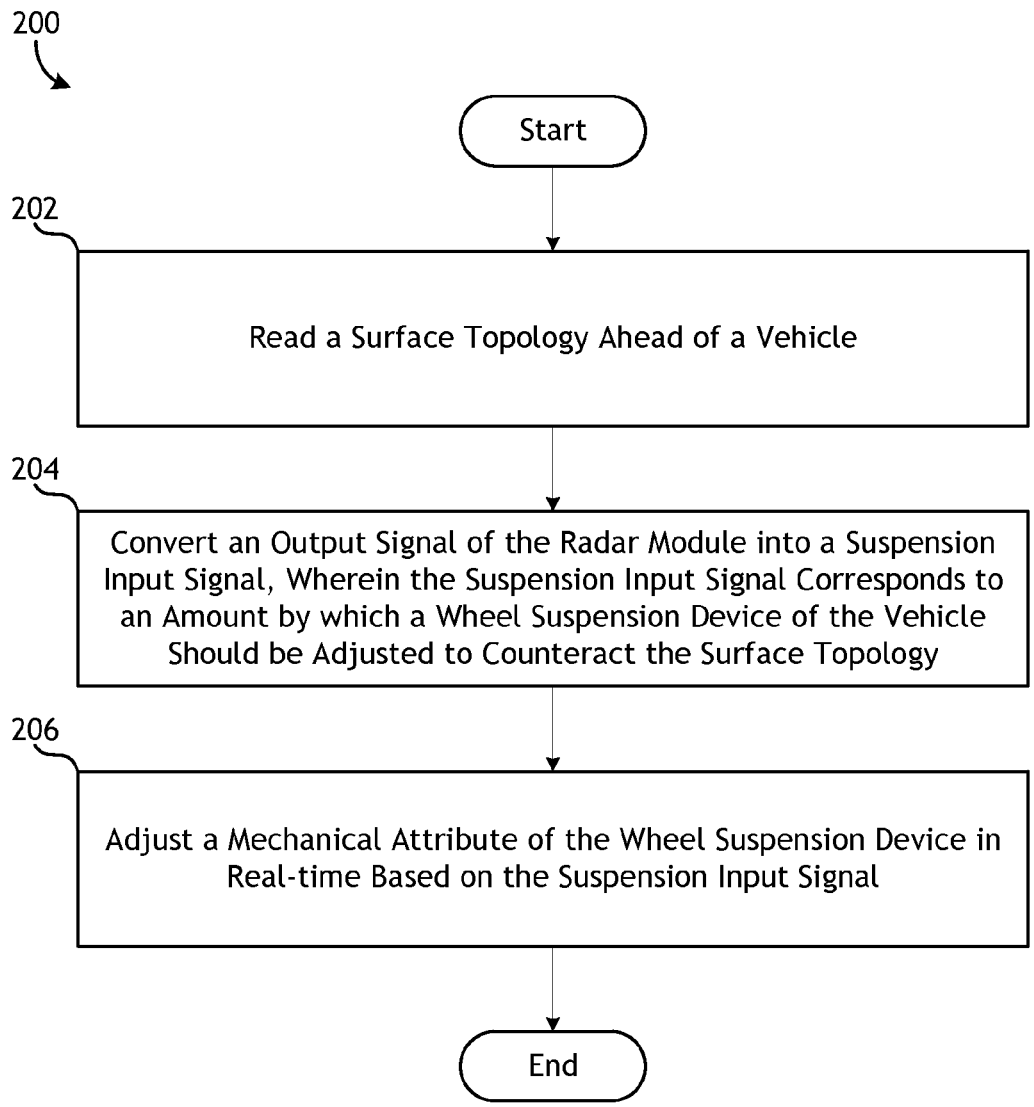
FIG. 2 is a schematic flowchart diagram illustrating one embodiment of a method for adapting an automobile suspension in real-time.

FIG. 2 is a schematic flowchart diagram illustrating one embodiment of a method 200 for adapting an automobile suspension in real-time. At block 202, the method 200 includes reading, with a radar module, a surface topology ahead of a vehicle. In an embodiment, the vehicle may be configured similarly to vehicle 102 of FIG. 1. As depicted in block 204, the method 200 includes converting, with a processor, an output signal of the radar module into a suspension input signal, wherein the suspension input signal corresponds to an amount by which a wheel suspension device of the vehicle should be adjusted to counteract the surface topology. As shown in block 206, the method 200 includes adjusting, with the processor, a mechanical attribute of the wheel suspension device in real-time based on the suspension input signal. In various embodiments the mechanical attribute may include a suspension stiffness value, a suspension rigidity factor, a distance by which the suspension device is moved, or the like.

FIG. 3 is a schematic block diagram illustrating one embodiment of an apparatus 300 for adapting an automobile suspension in real-time. As depicted, the apparatus 300 includes a first vehicle 302 and a second vehicle 304. In an embodiment vehicle 302 may be configured in a similar manner to vehicle 102 of FIG. 1. As shown vehicle 302 includes a gimbal mount 306 used to hold a radar module 308. In an embodiment gimbal mount 306 is located on a front end of vehicle 302. As depicted, the apparatus 300 also includes a scan distance 310 which corresponds to a current maximum visibility distance of between radar module 308 and second vehicle 304. In one embodiment a processor included in vehicle 302 may be configured to adjust gimbal mount 306 and thereby change the orientation of radar module 308 based on the current speed of vehicle 302 and also the length of scan distance 310 (i.e., the position of second vehicle 304 with respect to first vehicle 302). For example, if the rear end of the second vehicle 304 is within a pre-programmed threshold distance, such as one car length or 15 feet, of the front end of vehicle 302 then the processor of vehicle 302 will adjust gimbal mount 306 such that the scan distance 310 will be equal to the distance between the second vehicle 304 and the first vehicle 302. The radar module 308 will thus be oriented to have visibility to potholes and/or road bumps, such as surface topology item 312, that are located between the second vehicle 304 and the first vehicle 302. The radar module 308 may be configured to measure a surface topology distance 314 corresponding to the distance between surface topology item 312 and the front end of vehicle 302.

FIG. 4 is a schematic block diagram illustrating one embodiment of an apparatus 400 for adapting an automobile suspension in real-time. As depicted, the apparatus 400 includes a first vehicle 402. In an embodiment the first vehicle 402 may be configured in a similar manner to vehicle 102 of FIG. 1. As shown vehicle 402 includes a gimbal mount 404 used to hold a radar module 406. In an embodiment gimbal mount 404 is located on a front end of vehicle 402. As depicted in apparatus 400 there are no other vehicles or large obstructions directly in front of vehicle 402 that would block the visibility of radar module 406. A processor included in vehicle 402 may thus position gimbal mount 404 such that radar module 406 is oriented to have a maximum scan distance 408. In one embodiment, the processor of vehicle 402 may adjust gimbal mount 404 to increase the maximum scan distance 408 when vehicle 402 is travelling at high speed (e.g., when the speedometer reading of vehicle 402 is above a pre-defined speed threshold value). Radar module 406 may be configured to scan and detect a surface topology item 410 located in front of vehicle 402 and to measure a surface topology distance 412 corresponding to a current distance between surface topology item 410 and a front end of vehicle 402.

Figure 5:
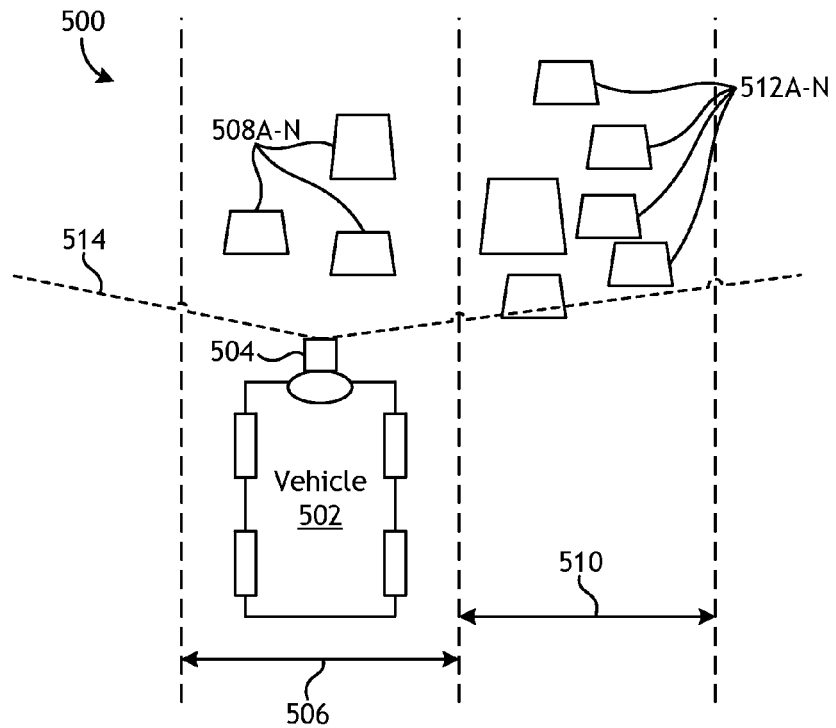
FIG. 5 is a schematic block diagram illustrating one embodiment of an apparatus for adapting an automobile suspension in real-time.

FIG. 5 is a schematic block diagram illustrating one embodiment of an apparatus 500 for adapting an automobile suspension in real-time. As depicted, the apparatus 500 includes a vehicle 502 with a radar module 504. In an embodiment vehicle 502 may be configured similarly to vehicle 102 of FIG. 1. In one embodiment vehicle 502 may be located in a first lane 506, and a second lane 510 may be open (i.e., not currently occupied by another vehicle). The first lane 506 may include one or more surface topology items 508A-N. Similarly, the second lane 510 may include one or more surface topology items 512A-N. In an embodiment radar module 504 may have a field of view 514 that includes both the horizontal and vertical directions (i.e., multiple axes) with respect to the front end of vehicle 502. For example, radar module 504 may be configured to scan both ahead and to the sides of vehicle 502 in order to detect surface topology items 508A-N in first lane 506 and also surface topology items 512A-N in second lane 510. In one embodiment a processor included in vehicle 502 may use data received from radar module 504 to determine whether the surface topology items 512A-N in second lane 510 are greater in number (i.e., count) and/or size (i.e., height or depth) than the surface topology items 508A-N in first lane 506. If the processor determines that the surface topology items 512A-N in second lane 510 are more numerous and/or larger than the surface topology items 508A-N in first lane 506, then the processor may use an output device, such as a LCD display screen, LED indicator light, or audible warning, to notify the driver of vehicle 502 that the second lane 510 is less favorable (i.e., rougher or more dangerous) than the first lane 506. In another embodiment, the processor may use an output device to notify the driver of vehicle 502 if another vehicle is located in second lane 510.

Figure 6:
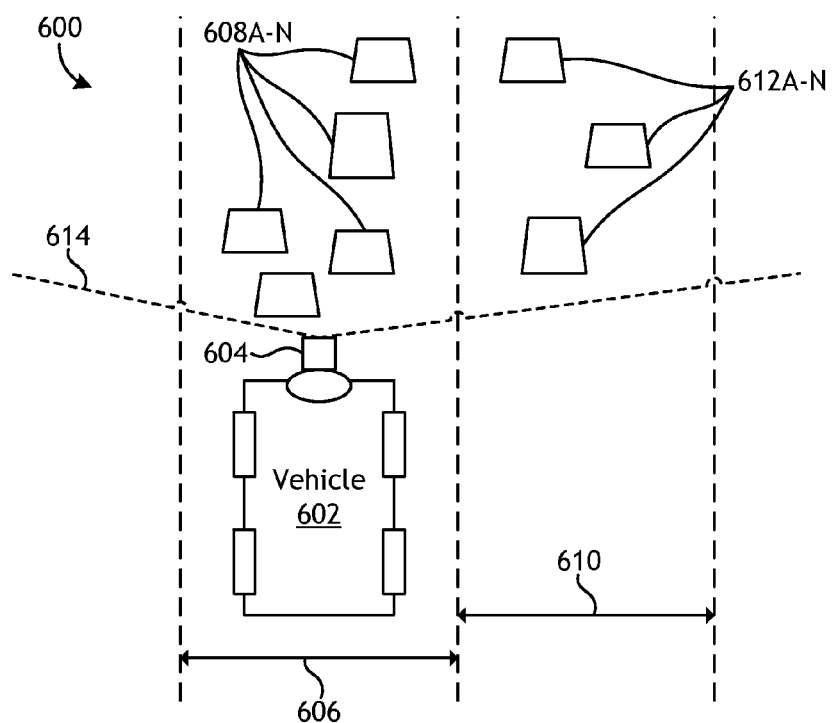
FIG. 6 is a schematic block diagram illustrating one embodiment of an apparatus for adapting an automobile suspension in real-time.

FIG. 6 is a schematic block diagram illustrating one embodiment of an apparatus 600 for adapting an automobile suspension in real-time. As depicted, the apparatus 600 includes a vehicle 602 with a radar module 604. In an embodiment vehicle 602 may be configured similarly to vehicle 102 of FIG. 1. In one embodiment vehicle 602 may be located in a first lane 606, and a second lane 610 may be open (i.e., not currently occupied by another vehicle). The first lane 606 may include one or more surface topology items 608A-N. Similarly, the second lane 610 may include one or more surface topology items 612A-N. In an embodiment radar module 604 may have a field of view 614 that includes both the horizontal and vertical directions (i.e., multiple axes) with respect to the front end of vehicle 602. For example, radar module 604 may be configured to scan both ahead and to the sides of vehicle 602 in order to detect surface topology items 608A-N in first lane 606 and also surface topology items 612A-N in second lane 610. In one embodiment a processor included in vehicle 602 may use data received from radar module 604 to determine whether the surface topology items 612A-N in second lane 610 are lesser in number (i.e., count) and/or size (i.e., height or depth) than the surface topology items 608A-N in first lane 606. If the processor determines that the surface topology items 612A-N in second lane 610 are less numerous and/or smaller than the surface topology items 608A-N in first lane 606, then the processor may use an output device, such as a LCD display screen, LED indicator light, or audible warning, to notify the driver of vehicle 602 that the second lane 610 is more favorable (i.e., smoother or less dangerous) than the first lane 606.

Figure 7:
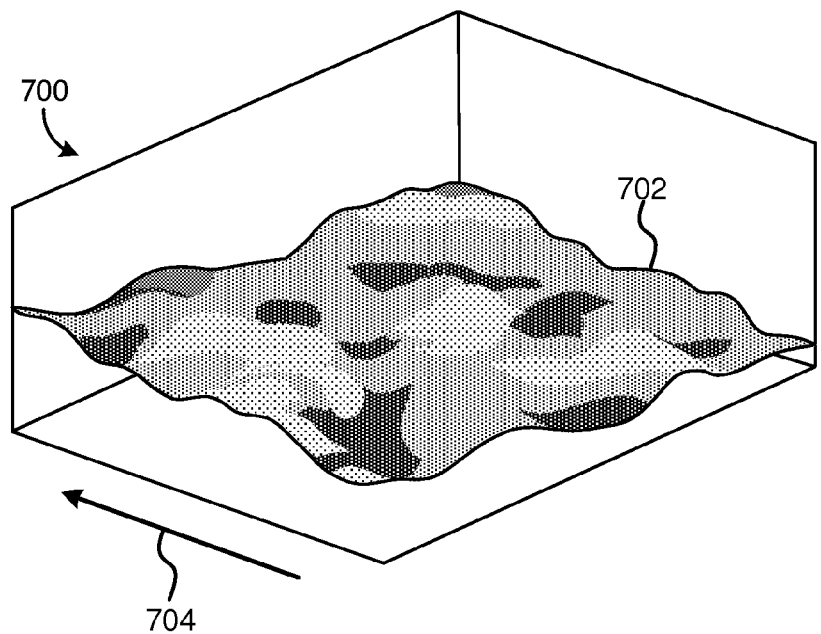
FIG. 7 is a schematic diagram illustrating one embodiment of a system for adapting an automobile suspension in real-time.

FIG. 7 is a schematic diagram illustrating one embodiment of a system 700 for adapting an automobile suspension in real-time. As depicted, the system 700 includes a road surface profile 702 and a direction of travel 704. In an embodiment the road surface profile 702 may include one or more peaks of varying height and/or one or more valleys of varying depth. In one embodiment a system for adapting an automobile suspension in real-time, such as system 100 of FIG. 1, may use a radar module to scan road surface profile 702 and measure the size of the one or more peaks and/or valleys with respect to a flat reference, such as calibration data stored in memory. In an embodiment the system for adapting an automobile suspension in real-time may use measurements from a radar module to build a contour map that corresponds to road surface profile 702. An exemplary contour map is illustrated in FIG. 8.

Figure 8:
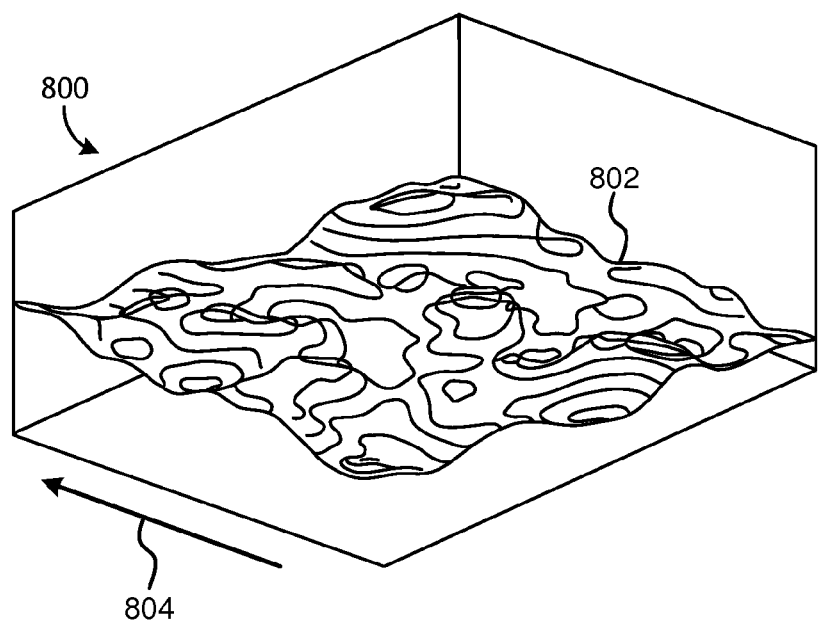
FIG. 8 is a schematic diagram illustrating one embodiment of a system for adapting an automobile suspension in real-time.

FIG. 8 is a schematic diagram illustrating one embodiment of a system 800 for adapting an automobile suspension in real-time. As shown, the system 800 includes a contour map 802 and a direction of travel 804. In one embodiment the contour map 802 may be a topographic map having one or more contour lines that correspond to various elevations. The contour map 802 may correspond to a road surface profile, such as road surface profile 702 of FIG. 7. In an embodiment, a system for adapting an automobile suspension in real-time, such as system 100 of FIG. 1, may include a processor configured for receiving data from a radar module in response to the radar module scanning a road surface profile. In one embodiment the processor may use the input data from the radar module to generate a contour map corresponding to the various elevations of the scanned road surface profile. In an embodiment the contour map may be stored in a memory and/or tagged with location data from a GPS unit.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method of adapting an automobile suspension in real-time, comprising:
   reading, with a radar module, a surface topology ahead of a vehicle;
   wherein the radar module further comprises a gimbal mount configured to provide vertical and horizontal visibility to the radar module;
   converting, with a processor, an output signal of the radar module into a suspension input signal, wherein the suspension input signal corresponds to an amount by which a wheel suspension device of the vehicle should be adjusted to counteract the surface topology;
   adjusting, with the processor, a mechanical attribute of the wheel suspension device in real-time based on the suspension input signal;
   adjusting, with the processor, the gimbal mount to provide a long distance visibility orientation of the radar module in response to the processor detecting that the vehicle is travelling above a speed threshold or there is not an obstruction directly in front of the vehicle; and
   adjusting, with the processor, the gimbal mount to provide a short distance visibility orientation of the radar module in response to the processor detecting that the vehicle is travelling below a speed threshold or there is an obstruction directly in front of the vehicle.

2. The method of claim 1, wherein converting the output signal into the suspension input signal further comprises calculating, with the processor, the amount by which the wheel suspension device should be adjusted based on a speed of the vehicle and a size of the surface topology.

3. The method of claim 1, wherein the radar module further comprises a laser-based infrared (IR) module, an optical camera module, or a light detection and ranging (LIDAR) module.

4. The method of claim 1, further comprising providing, with the processor, a road hazard notification to a user of the vehicle via an integrated output device in response to the radar module detecting a hazard having a size that exceeds a predefined hazard size threshold.

5. The method of claim 1, further comprising providing, with the processor, a relative lane quality notification to a user of the vehicle via an integrated output device in response to a horizontal scan of the radar module indicating that an adjacent lane topology is more or less favorable than a current lane that the vehicle is in.

6. The method of claim 1, further comprising:
storing, with a memory module, a first surface contour data corresponding to a first route;
comparing, with the processor, a second surface contour data corresponding to a currently traveled route to the first surface contour data of the first route; and
adjusting, with the processor, the mechanical attribute of the wheel suspension device based on the first surface contour data in response to the second route matching the first route.

7. A system for real-time adaptive automobile suspension, comprising:
a radar module configured to read a surface topology ahead of a vehicle, wherein the radar module further comprises a gimbal mount configured to provide vertical and horizontal visibility to the radar module; and
a processor configured to:
convert an output signal of the radar module into a suspension input signal, wherein the suspension input signal corresponds to an amount by which a wheel suspension device of the vehicle should be adjusted to counteract the surface topology;
adjust a mechanical attribute of the wheel suspension device in real-time based on the suspension input signal;
adjust the gimbal mount to provide a long distance visibility orientation of the radar module in response to the processor detecting that the vehicle is travelling above a speed threshold or there is not an obstruction directly in front of the vehicle; and
adjust the gimbal mount to provide a short distance visibility orientation of the radar module in response to the processor detecting that the vehicle is travelling below a speed threshold or there is an obstruction directly in front of the vehicle.

8. The system of claim 7, wherein the processor is configured to calculate the amount by which the wheel suspension device should be adjusted based on a speed of the vehicle and a size of the surface topology.

9. The system of claim 7, wherein the radar module further comprises a laser-based infrared (IR) module, an optical camera module, or a light detection and ranging (LIDAR) module.

10. The system of claim 7, further comprising an integrated output device, wherein the processor is configured to provide a road hazard notification to a user of the vehicle via the integrated output device in response to the radar module detecting a hazard having a size that exceeds a predefined hazard size threshold.

11. An apparatus for real-time adaptive automobile suspension, comprising:
a radar module configured to read a surface topology ahead of a vehicle, wherein the radar module further comprises a gimbal mount configured to provide vertical and horizontal visibility to the radar module; and
a processor configured to:
convert an output signal of the radar module into a suspension input signal, wherein the suspension input signal corresponds to an amount by which a wheel suspension device of the vehicle should be adjusted to counteract the surface topology; and
adjust a mechanical attribute of the wheel suspension device in real-time based on the suspension input signal;
adjust the gimbal mount to provide a long distance visibility orientation of the radar module in response to the processor detecting that the vehicle is travelling above a speed threshold or there is not an obstruction directly in front of the vehicle; and
adjust the gimbal mount to provide a short distance visibility orientation of the radar module in response to the processor detecting that the vehicle is travelling below a speed threshold or there is an obstruction directly in front of the vehicle.

12. The apparatus of claim 11, wherein the processor is configured to calculate the amount by which the wheel suspension device should be adjusted based on a speed of the vehicle and a size of the surface topology.

13. The apparatus of claim 11, wherein the radar module further comprises a laser-based infrared (IR) module, an optical camera module, or a light detection and ranging (LIDAR) module.

14. The apparatus of claim 11, further comprising an integrated output device, wherein the processor is configured to provide a road hazard notification to a user of the vehicle via the integrated output device in response to the radar module detecting a hazard having a size that exceeds a predefined hazard size threshold.

* * * * *